United States Patent [19]

Taber et al.

[11] Patent Number: 4,913,041
[45] Date of Patent: Apr. 3, 1990

[54] DEEP FAT FRYING APPARATUS

[75] Inventors: Bruce E. Taber; James T. Grob, both of Shreveport, La.

[73] Assignee: The Frymaster Corporation, Shreveport, La.

[21] Appl. No.: 118,755

[22] Filed: Nov. 5, 1987

[51] Int. Cl.[4] .......................... A47J 37/12; A47J 27/00
[52] U.S. Cl. ........................................ 99/403; 99/330; 126/343.5 A; 126/357; 126/391
[58] Field of Search ................. 99/330, 339, 359, 403, 99/407, 408; 122/44 A, 50, 116; 126/390, 391, 375, 376, 357, 343.5 A, 343.5 R; 431/326, 328, 284; 426/438

[56] References Cited

U.S. PATENT DOCUMENTS

| 2,109,212 | 2/1938 | Ehrgott | 99/331 |
|---|---|---|---|
| 2,548,177 | 4/1951 | Tauber | 126/343.5 |
| 2,912,975 | 11/1959 | Francia | 126/391 |
| 4,397,299 | 8/1983 | Taylor et al. | 126/391 |
| 4,690,127 | 9/1987 | Sank | 99/403 X |
| 4,704,290 | 11/1987 | Fritzsche | 99/403 X |
| 4,751,915 | 6/1988 | Price | 126/391 |

Primary Examiner—Timothy F. Simone
Attorney, Agent, or Firm—Hubbard, Thurman, Turner & Tucker

[57] ABSTRACT

A gas fired deep fat fryer has an upper heating section with a bottom wall from which a spaced pair of well sections depend. To efficiently melt solid shortening material initially disposed in the upper frypot section, the frypot is provided with an electric shortening melter that extends along the underside of the bottom wall of the upper frypot section. A solid insulating material panel structure envelopes and abuts portions of the well sections and defines therebetween a heating cavity which receives a dual gas-fired burner assembly. Interior surface portions of the panel structure are recessed to define a multi-pass heating flow passage system which extends along and is partially bounded by laterally outwardly facing exterior surface portions of the wells. During frypot operation, hot combustion gases from the burners are flowed through the passage system to very efficiently heating cooking oil disposed in the frypot. A specially designed mixture supply system is provided to flow a gas-air mixture into each of the gas-fired burners for combustion therein. In the mixture supply system non-positive gas regulators are used in conjunction with venturi portions thereof to advantageously prevent undesirable mixture enrichment in the event that the air supply pressure to the system drops below its normal level.

43 Claims, 7 Drawing Sheets

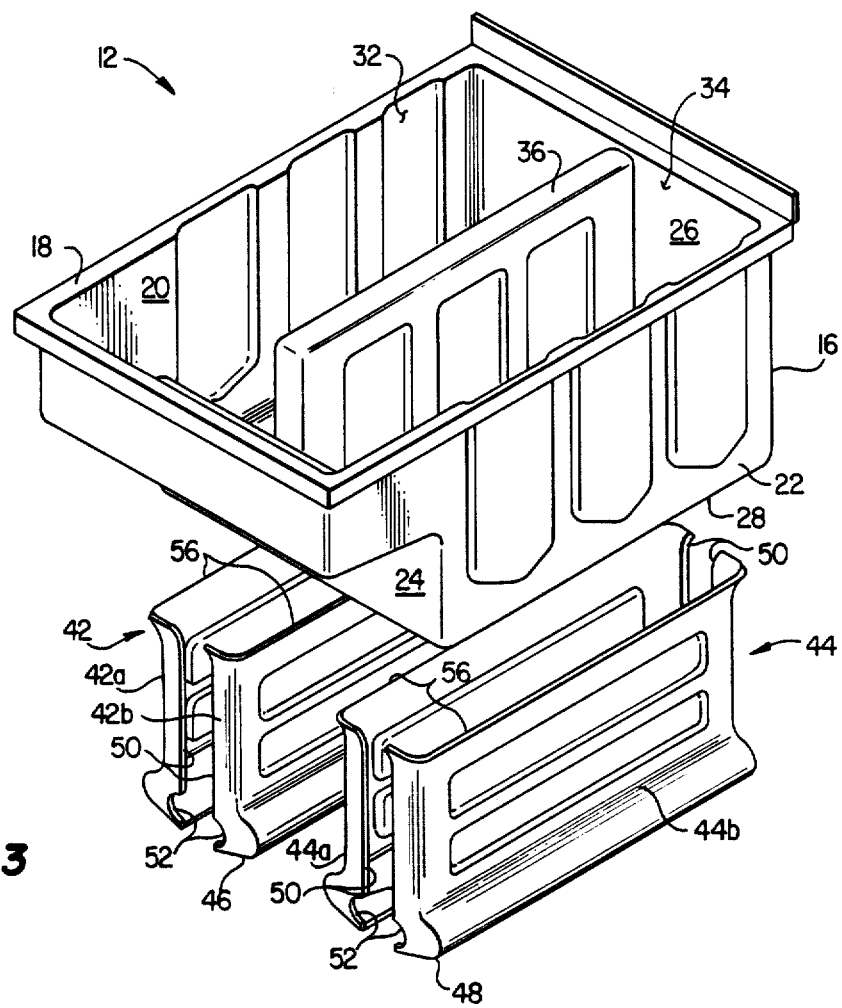
FIG. 3
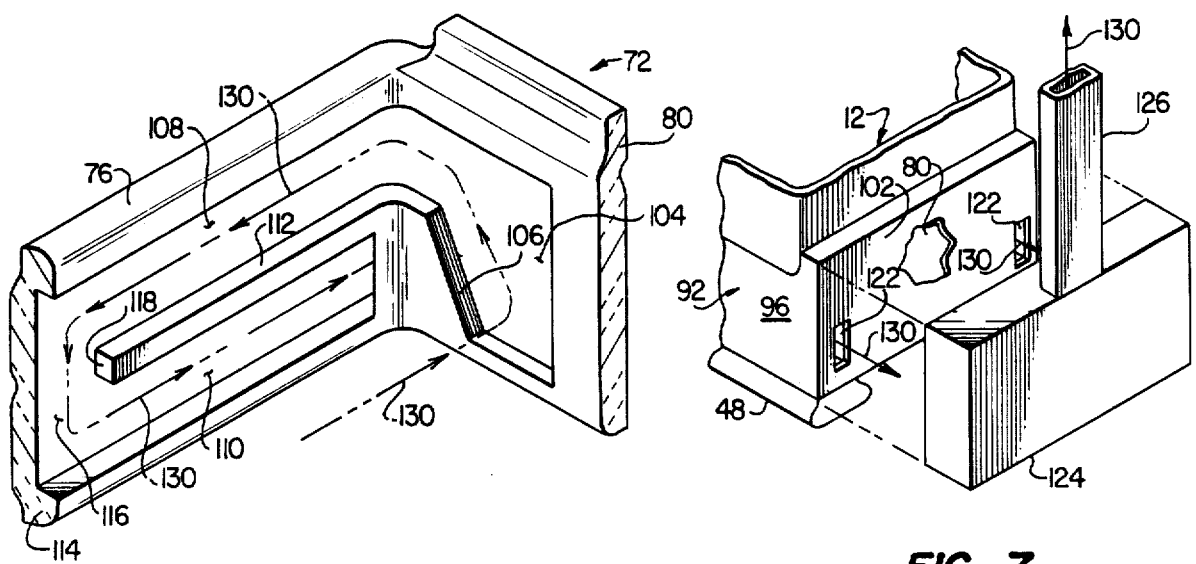
FIG. 6
FIG. 7

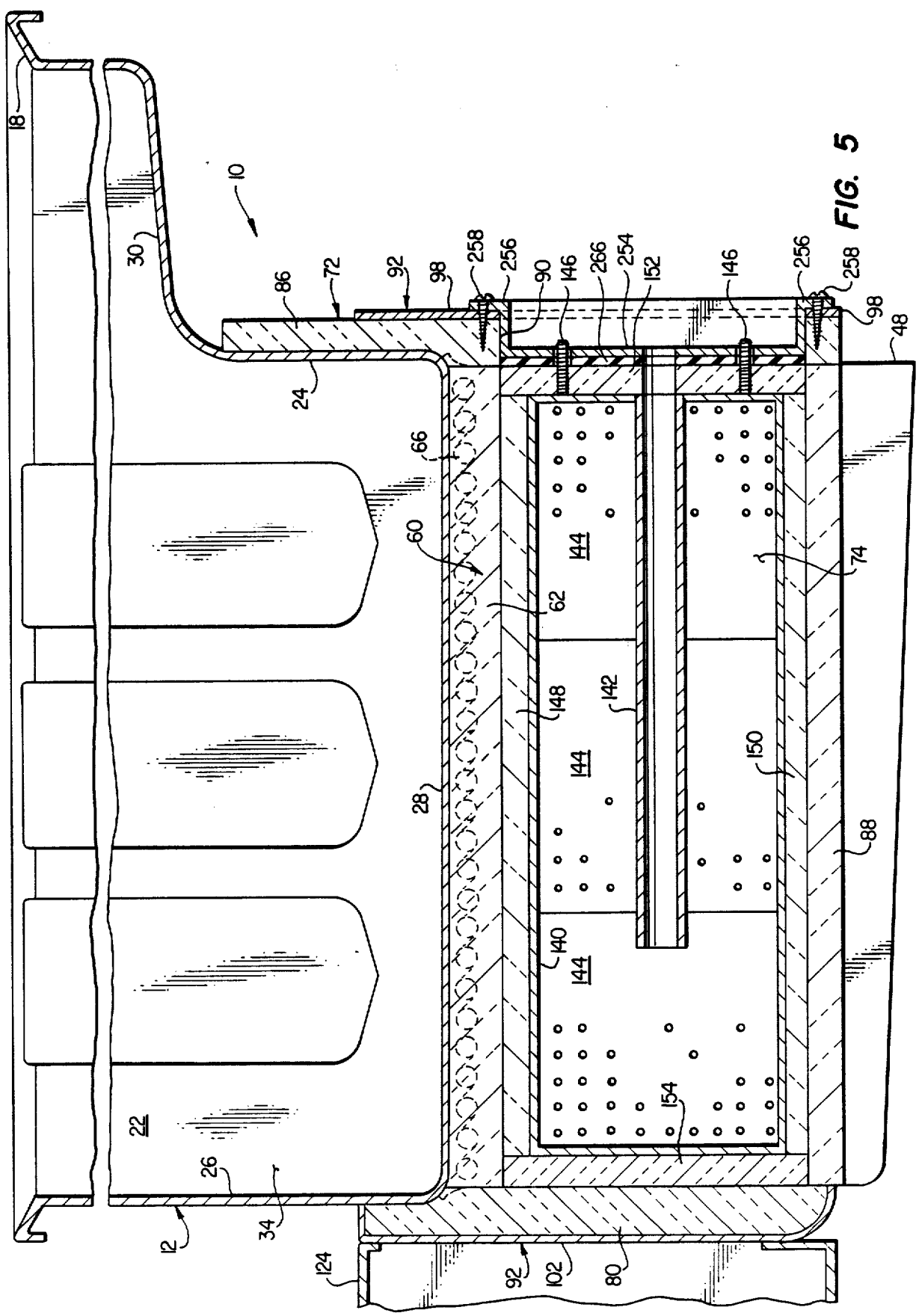

DEEP FAT FRYING APPARATUS

BACKGROUND OF THE INVENTION

The present invention relates generally to cooking devices, and more particularly provides structurally and operationally improved deep fat frying apparatus which, compared to conventional frying apparatus, is appreciably lighter in weight, less expensive to build and operate, has faster oil heating response times and better oil temperature control capabilities, and is provided with a frypot section having a unique construction which enables it to be more rapidly and thoroughly cleaned. Additionally, the frypot section has incorporated therein a shortening melter which significantly improves the initial solid shortening melting process used to form the cooking oil within the frypot.

Conventional deep fat fryers used in commercial cooking operations are typically provided with a metal frypot section in which a quantity of heated cooking oil is disposed. A variety of food items may be deep fried in the heated cooking oil by lowering them into the oil by means of wire frying baskets. A conventional method of heating the cooking oil is to provide a gas-fired burner structure which generates hot combustion gas that is flowed through various externally insulated, all-metal heating passages extending around the exterior of certain wall sections of the frypot. A suitable supply system is utilized to flow a gas-air mixture to the burner structure for combustion therein to generate the hot combustion gas.

A variety of problems, limitations and disadvantages are commonly associated with deep fat fryers of this general type. For example, the frypot section is typically fabricated from a variety of metal panels which are welded together at edge portions thereof to define the metal shell of the frypot. This conventional fabrication technique results in the frypot shell having angled interior corners along which weld joint lines extend. These angled interior corners render the periodic cleaning of the frypot interior somewhat difficult at such corner sections. Additionally, if the interior cleaning process is not carried out rather carefully, residual cooking oil can remain in the corners giving rise to a potential sanitation problem when a subsequent batch of cooking oil is placed in the frypot.

Another problem arises during the shortening melting process in which a large block of solid shortening is placed within the frypot to be melted to form the actual cooking oil. The conventional frypot has an upper section in which the actual food cooking is performed, and one or more smaller cross-sectioned well sections depending from the upper cooking section. Under conventional practice, the solid shortening block is placed in the upper frypot section so that it rests upon the bottom wall of such upper section and is disposed above the empty well portion of the frypot. To melt the shortening block it has heretofore been necessary to utilize the main heating system for the frypot, which normally supplies heat to the exterior walls of the frypot well sections. This main heating system typically has a capacity far in excess of that required to simply melt the solid shortening block. Accordingly, to prevent burning and/or smoking of the melted shortening which initially flows downwardly into the well section of the frypot, it has previously been necessary to "pulse" the main heating system to prevent overheating of the well section walls. This rather cumbersome shortening melting procedure requires a considerable amount of supervision and is basically a labor-intensive "hands on" process.

Alternatively, various auxiliary heating devices have been proposed to perform the initial solid shortening melting process. One such device is basically an electrically heated plate structure which has a series of openings formed therethrough and is rested on the bottom wall of the upper frypot section. With this heating plate in place, the shortening block is positioned on its upper surface and the plate's heating coils are energized. As the shortening is melted, it runs through the plate openings down into the unheated frypot well section. When all of the solid shortening is melted, the heating plate is lifted out of the frypot and the main oil heating process is initiated. While this alternate technique is somewhat less hazardous, it also requires worker supervision and is somewhat cumbersome and time consuming. Like the previously described main heating system pulsing process, the use of heated, drop-in plates is also a "hands on" process.

As previously mentioned, the hot combustion gas generated by the gas-fired burner structure is flowed through oil heating passages which are formed around suitable exterior surfaces of the frypot well section or sections. The conventional method of forming these passages is to form them from an auxiliary metal structure which abuts exterior wall surfaces of the metal frypot. The outer surface of this metal heating passage structure is typically exteriorly insulated with suitable insulation material. As the hot combustion gas from the gas-fired burner structure is flowed through these all-metal heating passages, a significant portion of the available combustion gas heat is unavoidably diverted into the significant mass of metal used to form the heating passages in conjunction with the frypot walls which are actually heated.

Stated in another manner, during the initial oil heating process, only a portion of the available combustion gas heat is transferred inwardly through the frypot shell wall into the heating oil-the balance of such heat is transferred outwardly into the other metal walls of the heating flow passages. Because of this relatively large metal mass into which the heat of the combustion gas can flow, the response time between the initiation of the oil heating process and the attainment of the desired operating temperature of the cooking oil has been correspondingly delayed. Additionally, the control of the temperature of the cooking oil is less precise than it might otherwise be.

Yet another problem is related to the supply systems used to provide to the gas-fired burner structure a gas-air mixture for combustion therein. Typically such supply systems include a forced air blower which flows a supply of pressurized air into the burners, and a gas supply system which forces a stream of gaseous fuel through a gas pressure regulator into the flowing air stream for mixture therewith and supply with the air stream to the burner structure. One problem associated with this conventional gas-air mixture supply system is the possibility that, upon regulator failure, gas can be flowed through the system in the absence of air flow. Another heretofore unavoidable problem associated with such supply systems is that when a blower outlet pressure drop is experienced (when, for example, a leak develops in the gas supply ductwork) the air-fuel mixture supplied to the frypot burners becomes richer, thereby resulting in fuel wastage.

It can readily be seen from the foregoing that a variety of improvements are needed in conventional deep fat fryers. Accordingly, it is an object of the present invention to provide a deep fat fryer which incorporates such improvements.

SUMMARY OF THE INVENTION

In carrying out principles of the present invention, in accordance with a preferred embodiment thereof, improved deep fat frying apparatus is provided which eliminates or very substantially reduces the previously mentioned problems, disadvantages and limitations of conventional deep fat fryers.

In a preferred embodiment thereof, the deep fat frying apparatus of the present invention includes a uniquely constructed metal frypot which has an upper heating section, and a spaced pair of well sections depending from the bottom wall of such upper section. The upper frypot section is formed from a single sheet of metal using a deep-draw process. Each of the depending well sections is defined by intersecured lateral halves which are each formed from a single sheet of metal using a shallow-draw process. The shallow-drawn lateral halves of the well sections are welded together to define the particular well, the completed wells being welded at their open upper ends around suitable openings formed in the bottom wall of the upper frypot section.

The result of this combination deep-draw and shallow-draw fabrication process is that each interior corner portion of the completed frypot is radiused and devoid of weld lines or other joint sections. This significantly improves the overall interior cleanability of the completed frypot and greatly reduces the potential for sanitation problems caused by residual, previously used cooking oil adhering to the interior corner portions of the frypot.

The oil heating response time of the improved fryer apparatus of the present invention is significantly reduced by utilizing solid insulation material to form combustion gas heating passages along exterior surfaces of the depending well sections of the frypot. This is preferably achieved by providing a solid insulation panel structure which envelops portions of the depending well sections and defines therebetween a heating cavity in which a dual gas-fired burner assembly is operatively disposed. Interior surface portions of various of the solid insulation panel sections, which are held in abutment with exterior wall surface portions of the well sections by a metal retaining jacket structure extending outwardly around the insulation panels, define a combustion gas flow passage system which has an inlet portion that communicates with the interior of the heating cavity and an outlet portion which opens outwardly through the metal retaining jacket. Hot combustion gas which is discharged from the burner assembly into the heating cavity is flowed therefrom into the inlet portion of the heating passage system, through the passage system in multiple passes along laterally outwardly facing wall surfaces of the depending well sections, and then outwardly through the metal retaining jacket structure into a suitable exhaust header and stack system.

Importantly, because the combustion gas heating flow passage system is defined to a large extent by the solid insulation which envelops portions of the well sections, a considerably greater amount of the available combustion gas heat is transferred inwardly through the well section walls instead of having a relatively large portion of such available heat transferred to the balance of the passage-defining structure as is the case when conventional all-metal heating passages are used. In this manner, the oil heating response time is significantly diminished compared to conventional systems in which the combustion gas heating passages are of all-metal construction, and the ability to more precisely control the temperature of the cooking oil is advantageously provided.

The present invention also provides a uniquely operative mixture supply system for flowing a gas-air mixture into the gas-fired burner assembly disposed within the frypot heating cavity. Such mixture supply system preferably comprises a single air blower, a pair of air supply plenums each communicating with the outlet of the blower, a pair of mixture supply passages interconnected between the air supply plenums and the inlets of the dual burners, and a pair of venturi sections each operatively disposed within one of the two mixture passages and having a central throat portion, an upstream end portion, and a downstream end portion.

The flow of gaseous fuel is supplied to the central throat portions of the two venturi sections by a pair of nonpositive gas pressure regulators, each of the regulators having an inlet adapted to receive a supply flow of pressurized gas from a source thereof, an outlet communicated with one of the central throat portions of the venturi sections, and a vent which communicates with one of the upstream end portions of the venturi sections. These non-positive gas pressure regulators may either be zero gas pressure regulators or, preferably, negative gas pressure regulators.

Because of the unique venturi-connection of the non-positive gas pressure regulators, in the event that the outlet pressure of the air blower is diminished, the air-fuel mixture being delivered to the dual burner assembly is not appreciably enriched. In fact, when negative gas pressure regulators are utilized, the ratio of the air-fuel mixture actually experiences a slight increase (i.e., the mixture becomes somewhat "leaner"). Additionally, particularly in the case where the negative gas pressure regulators are utilized, the possibility of gas flow into the mixture supply system without a corresponding air flow therethrough, is substantially eliminated.

Use of the non-positive gas pressure regulators provides yet another important advantage-namely, that the improved mixture supply system of the present invention is operative with a main gas inlet supply pressure as low as 2.0" $H_2O$. This permits use of the improved deep fat fryer in applications and locations where manufactured gas is the only source of gaseous fuel available to fire the frypot burner assembly. This is particularly advantageous in underdeveloped countries in which natural gas (which typically has a minimum main supply pressure of at least 4.0" $H_2O$) is unavailable and manufactured gas must be used as the fryer fuel source.

According to another feature of the present invention, an interchangeable fuel and air orifice plate is removably interposed between the blower outlet and the air supply plenums. Formed through this interchangeable orifice plate are a pair of gas orifice openings and at least two air orifice openings. The main fuel and air supply flows are forced through these orifice openings to establish an air-fuel ratio in the mixture which is supplied to the burner assembly. By simply removing the orifice plate and replacing it with another plate having differently sized air and gas orifice openings, this ratio can be quickly and easily altered when desired.

According to yet another feature of the present invention, the air supply plenums, the venturi sections, and a portion of the two mixture flow passages are defined by a pair of openings formed through a block of solid insulation material which forms a portion of the solid insulation structure enveloping portions of the frypot well sections. The insulation element thus performs not only an insulating function, but very compactly defines several key elements of the overall mixture supply system.

Uniquely incorporating, as it does, the foregoing structural and operational features, the improved deep fat frying apparatus of the present invention is significantly lighter in weight than conventional deep fat frying apparatus, has improved oil heating response and temperature control capabilities, is less expensive to manufacture and operate, and is safer and more fuel efficient.

BRIEF DESCRIPTION OF THE DRAWINGS

FIG. 3 is an exploded perspective view of the frypot shell illustrating a unique deep draw-shallow draw fabrication technique used to construct the shell;

FIG. 5 is a vertically foreshortened cross-sectional view through the apparatus taken along line 5—5 of FIG. 4, with certain portions of the air-gas mixture supply system being removed for illustrative purposes;

FIG. 6 is a fragmentary perspective view of a side and rear portion of a solid insulation panel structure used to insulate the well sections of the frypot and to form a hot combustion gas heating passageway system therefor;

FIG. 7 is a reduced scale, fragmentary, partially exploded rear perspective view of the frypot portion of the apparatus and illustrates combustion gas discharge and exhaust stack portions thereof;

DETAILED DESCRIPTION

Figure 1:
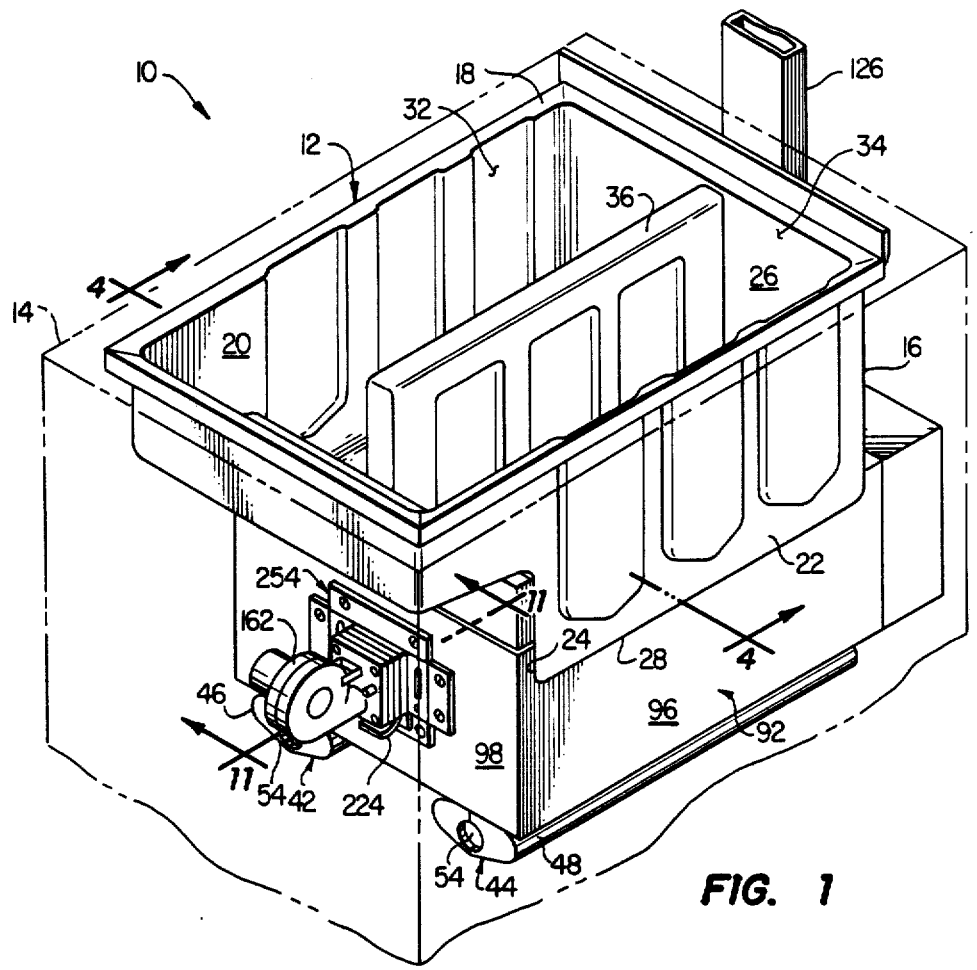
FIG. 1 is a fragmentary perspective view of improved deep fat frying apparatus which embodies principles of the present invention, a portion of the outer housing of such apparatus being illustrated in phantom.
Figure 2:
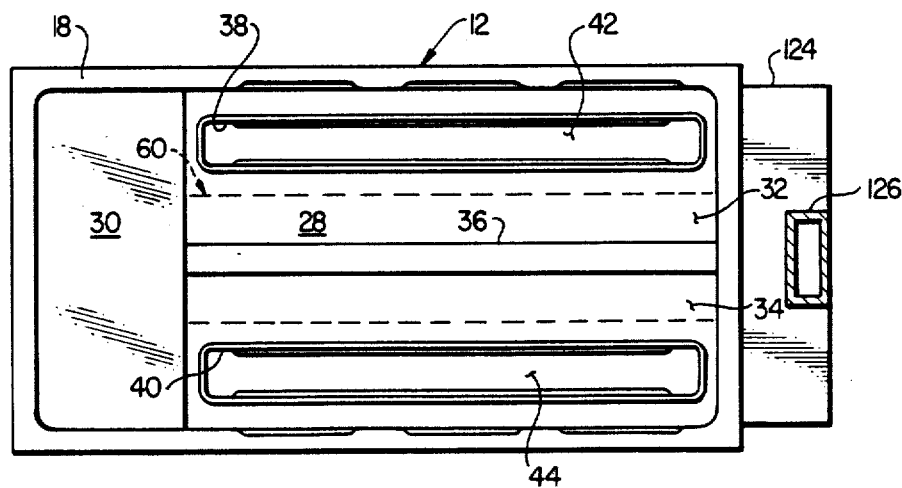
FIG. 2 is a top plan view of the frypot section of the apparatus.

As illustrated in FIGS. 1-3, the present invention provides significantly improved deep fat frying apparatus 10 which obviates a variety of structural and operational problems encountered in deep fat frying apparatus of conventional construction. The apparatus 10 includes a metal frypot 12 which is preferably formed from a suitable stainless steel material and is supported in a conventional manner within an outer housing or cabinet 14 shown in phantom in FIG. 1. Frypot 12 has an open-topped upper portion 16 which is bordered at its upper end by a support flange 18 and is defined by a pair of opposite side walls 20 and 22, a front end wall 24, a rear end wall 26, and a bottom wall 28. A lower portion of the front end wall 24 (FIGS. 1 and 3) is rearwardly offset, with an upper portion of such end wall sloping forwardly and upwardly to define within the frypot a sloping front shelf portion 30 (FIG. 2). The interior of the upper frypot portion 16 positioned rearwardly of the shelf 30 is divided into two lateral sections or chambers 32 and 34 by means of a metal divider panel 36 projecting upwardly from the bottom wall 28.

Formed through the bottom wall 28 on opposite sides of the divider 36 within the lateral frypot chambers 32 and 34, respectively, are a pair of wall openings 38 and 40 which are elongated in a front-to-rear direction. A pair of relatively narrow well sections 42 and 44 extend downwardly from the bottom wall 28 and have their open upper ends butt-welded to the underside of wall 28 around the periphery of the openings 38 and 40. The lower ends of the well sections 42 and 44 are transversely enlarged to respectively form "cold" sections 46 and 48 of the wells 42 and 44.

The upper portion 16 and the depending well sections 42 and 44 of the frypot 12 are adapted to hold a quantity of cooking oil or melted shortening which is heated in a manner subsequently described. The oil disposed within the upper frypot chambers 32, 34 defines therein cooking zones into which a variety of food products to be deep fat fried may be lowered by means of conventional wire baskets (not illustrated). The elongated narrow upper portions of the well sections 42 and 44 define therein an oil heating zone into which heat is transferred through the elongated sidewalls of such well portions. The transversely enlarged cold sections 46 and 48 of the wells provide in the cooking oil relatively cool zones into which various food and breading bits may fall, the cooler oil temperature within these "cold" sections keeping the food and/or breading bits from burning during the deep fat frying process being carried out in the upper cooking zones of the heated oil.

Frypots of this general type are conventionally constructed by welding appropriate panel sections together to form the overall frypot configuration. One problem associated with this conventional frypot fabrication technique is that the constructed frypot is unavoidably provided with various sharp interior corners along which weld joints extend. This sharp interior corner configuration can render the thorough cleaning of the interior of the frypot somewhat difficult and time-consuming. If the corner-cleaning process is not performed with sufficient care, a sanitation problem can arise when fresh oil is placed in the frypot with residual food and oil from a prior batch thereof adhering to these sharp interior corner areas.

This potential sanitation problem is uniquely solved in the present invention by utilizing a deep-draw forming process to construct the upper frypot portion 16 from a single sheet of metal. A shallow draw process is used to form the well sections 42 and 44 in lateral halves 42$_a$ and 42$_b$, and 44$_a$ and 44$_b$, as best illustrated in FIG. 3. The well section halves are then welded to each other along their laterally facing edge surfaces 50 to form the well sections 42 and 44, the front ends of the well section halves being provided with semicircular recesses 52 to define in the cold sections 46, 48 outlet drainage openings 54 (FIG. 1) to which appropriate drain conduits (not shown) may be operatively connected. After the halves of the well sections 42 and 44 have been welded together in this manner, the open upper ends 56 of the well sections 42 and 44 (FIG. 4) are butt-welded to the underside of the lower wall 28 of the upper frypot portion 16 around the wall openings 38 and 40.

The result of this unique construction of the frypot 12 is that the entire frypot is devoid of corner welds, and all interior corners of the frypot are radiused and free from weld joints. The elimination in this manner of sharp interior corners within the frypot greatly facilitates the cleaning of the interior thereof and significantly diminishes the potential sanitation problems heretofore associated with frypots of conventional construction.

Figure 4:
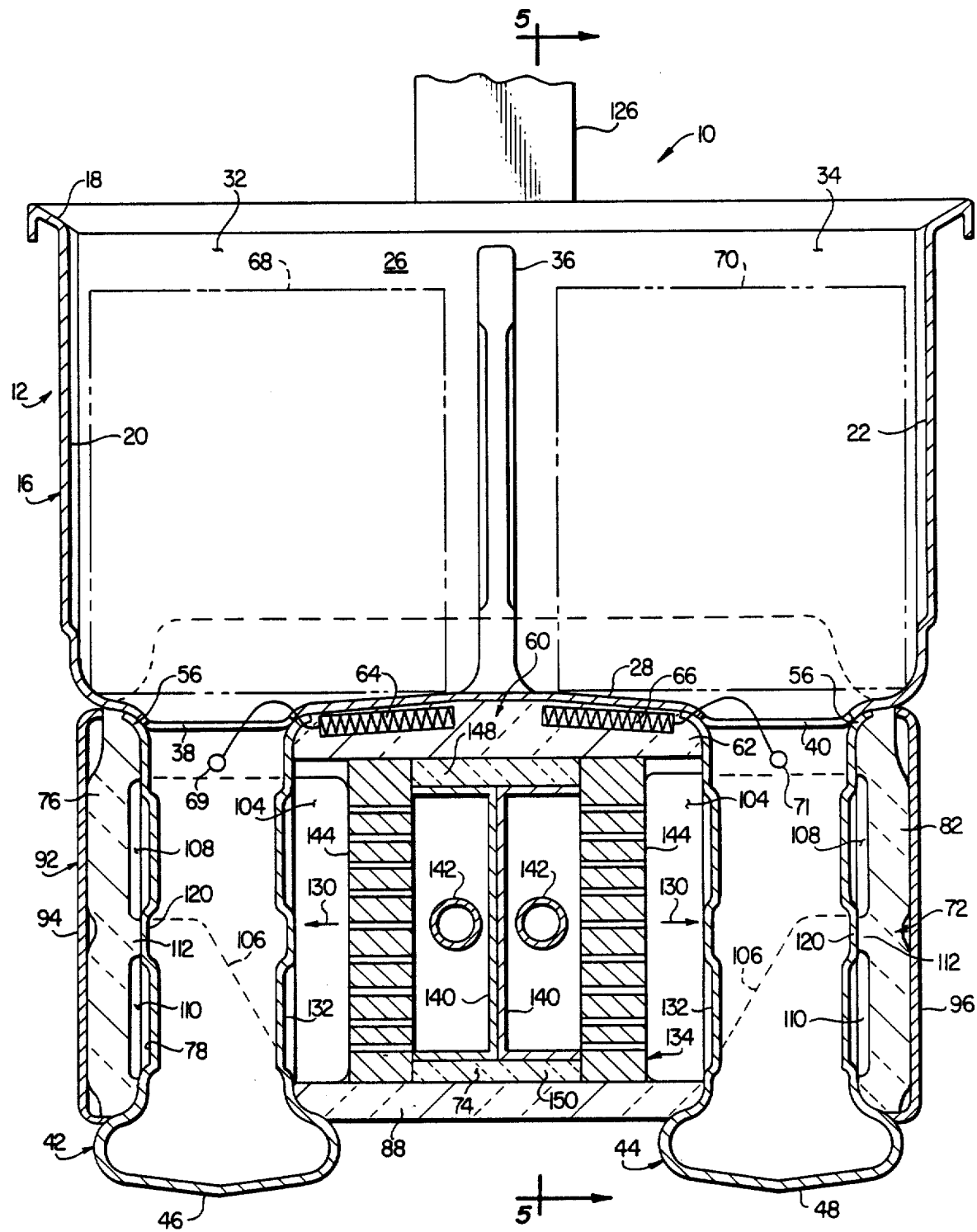
FIG. 4 is an enlarged scale cross-sectional view through the apparatus taken along line 4—4 of FIG. 1.

Referring now to FIGS. 2, 4 and 5, another problem associated with frypots of conventional construction arises during the melting of solid shortening therein to form the oil utilized in the deep fat frying process. Solid shortening is typically provided in large, standard sized blocks which are melted within the frypot to fill it with liquid shortening. In conventional frypots, the solid shortening is typically melted within the frypot by simply placing the shortening block therein and then utilizing the main heating system to melt the shortening. When initially placed in the upper portion of the frypot, the solid shortening block, because of its size, is retained within the upper frypot portion so that the wells of the frypot remain dry until the shortening begins to melt and fill such wells.

Shortening melting problems can easily arise due to the fact that the heating source for the frypot typically transfers a large portion, if not all of the heat thereto through the walls of the wells. Accordingly, it is often necessary to "pulse" the main heating system of the frypot in order to initiate the melting of the shortening block. This is a very inefficient process since the heated wall surfaces of the frypot well sections do not initially contact the shortening block. If the main heating system for the frypot, rather than being pulsed, is simply run continuously, the dry well walls can be heated to such an extent that when melted shortening contacts them the liquid shortening simply flashes, causing the shortening to smoke and potentially catch fire. Conventional melting of solid shortening within frypot structures must thus be performed with a considerable degree of care and supervision.

As an alternative to this rather laborious pulsing and continual supervision of the main heating system of the frypot, various portable electrical devices may be used which are temporarily inserted into the frypot to assist in melting the shortening block. One such device comprises a metal, electrically heated plate which is rested on the lower wall of the upper frypot section and is provided with a series of openings formed therethrough. With this electrically heated plate in place, the shortening block is rested on its upper surface and the heating element or elements are energized. As the shortening block melts, the resulting liquid drains through the plate openings into the frypot wells. As in the case of pulsing the main heating system of the frypot, however, this method is somewhat cumbersome, and requires "hands on" supervision and handling during the shortening melting process.

The present invention uniquely solves this problem by the provision of a shortening melter 60 (FIGS. 2, 4 and 5) which is positioned beneath the bottom frypot wall 28, the melter 60 extending laterally between the well sections 42 and 44 and longitudinally between the rear end wall 26 of the frypot and the rear edge of the sloping shelf 30. Shortening melter 60 comprises an elongated solid insulation panel 62 having suitably imbedded in its upper surface a pair of electric resistance heating elements 64 and 66 (FIG. 4). These heating elements 64, 66 are of relatively low wattage (approximately 300–500 watts each) and are positioned immediately adjacent the underside of the bottom frypot wall 28, with the heating element 64 (as viewed in FIG. 4) being positioned to the left of the central divider 36 and the heating element 66 being positioned to the right of such divider.

During the shortening melting process, a standard sized block of solid shortening is cut into two essentially equal portions 68 and 70, each of which is dropped into one of the upper frypot chambers 32 and 34 as best illustrated in FIG. 4. The solid shortening portions 68 and 70 rest upon the bottom wall 28 of the upper frypot portion 16 and are positioned above the bottom wall openings 38 and 40. With the solid shortening portions 68, 70 positioned in this manner, the melter heating elements 64 and 66 are energized. Portions of the shortening blocks 68 and 70 contacting the bottom wall 28 directed above the heating coils begin to melt, and drain into the depending well sections 42 and 44. During this initial melting process, there is no need to cycle the low wattage heating coils 64, 66, and only the central portion of the bottom wall 28 in contact with the solid shortening is being heated. Accordingly, there is no sudden contact between any portion of the shortening and a dry, heated wall portion of the frypot.

Thus, a truly "hands off" method of heating and initially melting the solid shortening is uniquely provided. Suitable thermostatic sensing and control elements 69 and 71 may be conveniently disposed in upper portions of the well sections 42 and 44, respectively, to de-energize the individual heating coils 64 and 66 when a suitable temperature level is reached in each of the wells which is indicative of such well being filled with melted shortening which has been heated to a predetermined temperature (preferably to approximately 185° F.).

It can readily be seen that the structure of the frypot 12 just described provides therein two separate oil heating sections—the first section being defined by the upper chamber 32 and its associated well section 42 positioned to the left of the divider 36 in FIG. 4, and the second section being defined by the chamber 34 and its associated well section 44 disposed to the right of such divider. As will be seen, the frypot is provided with a primary heating system which may be operated to selectively heat either or both of the well sections 42 and 44 to thereby provide heat to either or both of the overall oil heating sections of the frypot. In a similar fashion, the melter heating elements 64, 66 may be selectively and independently energized to provide for the improved melting of shortening in either one or both of these oil heating sections. Accordingly, if desired, only one of the solid shortening portions 68, 70 may be placed in one of the upper chambers 32, 34 and melted without providing shortening melting heat to the other of such upper chambers.

Alternatively, if desired, the divider 36 may be eliminated from the frypot structure so that there is but a single upper frypot chamber which communicates with each of the well sections 42, 44. In this event, the two melter heating elements 64, 66 could be replaced with a single heating coil which extends across essentially the entire upper surface of the insulation element 62. In this case a standard sized, uncut block of solid shortening would be dropped into the single, larger upper chamber and melted as previously described with the single melter element.

As previously mentioned, the primary cooking heat supplied to the melted shortening disposed within the frypot 12 is transferred thereto through various wall portions of the depending well sections 42 and 44. With reference to FIGS. 4–7, this heat transfer is achieved by flowing hot combustion gas through a passageway system uniquely formed in a solid insulation panel structure 72 that extends around the well sections 42 and 44 and defines therebetween a heating cavity 74.

The insulation structure 72 includes a side panel portion 76 which extends horizontally along the outer side surface 78 of the well section 42, a rear panel portion 80 which extends behind and rearwardly abuts the wells 42 and 44 and defines a rear boundary of the heating cavity 74, a side panel portion 82 which extends along the outer side surface 74 of the well section 44, a front panel portion 86 which extends across the front end surfaces of the wells 42 and 44 and defines a forward end of the heating cavity 74, and a lower insulation panel 88 which rests upon the opposite, inwardly facing portions of the well cold sections 46 and 48 and defines a lower boundary of the heating cavity 74.

As best illustrated in FIG. 5, the rear insulation panel 80 extends upwardly a short distance along the outer surface of the rear frypot wall 26, while the front insulation panel portion 86 extends upwardly a greater distance along the outer surface of the forward frypot wall 24. A rectangular access opening 90 (FIG. 5) is formed through the front insulation panel 86, the opening 90 extending horizontally between the laterally facing inner side surfaces of the wells 42 and 44, and extending vertically between the lower surface of the melter insulation panel 62 and the upper surface of the lower insulation panel 88. The side insulation panels 76, 82 and the rear insulation panel 80 may be conveniently formed as a generally U-shaped insulation section (a portion of which is depicted in FIG. 6) or may be alternately formed as separate panel sections.

The panel portions which define the insulation structure 72 are held tightly in place against the well section surfaces which they abut by means of a metal retaining jacket structure 92 that extends outwardly around the insulation panel sections 76, 80, 82 and 86. This metal jacket structure is defined by a pair of side sections 94 and 96 which respectively overlie the side insulation panel sections 76 and 82, a front jacket section 98 (FIGS. 1 and 5) which overlies the front insulation panel section 86 and has a rectangular opening 100 (FIG. 12) in registry with the insulation opening 90, and a rear jacket section 102 (FIG. 7) which overlies the rear insulation panel 80. These four metal jacket sections are suitably intersecured to tightly retain the side, front and rear insulation panels tightly against the frypot well sections as illustrated.

The previously described solid insulation panels 62, 76, 80, 82 and 86 are preferably formed from a lightweight, vacuum-formed ceramic fiber material which is relatively inexpensive and can be conveniently molded in a variety of desired configurations. The ceramic fiber insulation panels serve not only to insulate the heated well sections of the frypot, but also internally define a combustion gas passageway system which will now be described with reference to FIGS. 4, 6 and 7.

The combustion gas passageway system is, for the most part, defined by various interior surface depressions formed in the side insulation panels 76 and 82, and the rear insulation panel 80, and partially bounded by various outer surface portions of the frypot well sections 42 and 44. As best illustrated in FIGS. 4 and 6, the passageway system includes inlet portions 104 formed in the interior surface of the rear insulation panel 80 adjacent its junctures with the side insulation panels 76 and 82. Laterally inner end portions of the passage inlets 104 project inwardly of the well sections 42 and 44 (FIG. 4) and are provided with upwardly and laterally outwardly tapering lower wall portions 106 which function to progressively narrow the passage inlet portions 104 in a laterally outward direction. The narrowed outer ends of the passage inlet portions 104 communicate with a pair of horizontally extending, reduced cross-section flow passages 108 formed in the interior surfaces of the panel side sections 76 and 82. These upper horizontal flow passages 108 are separated from lower horizontally extending flow passages 110 (of still further reduced cross-sectional areas) formed in the insulation side panels 76 and 82 by horizontally extending divider ribs 112 which terminate rearwardly of the forward end portions 114 of the insulation panels 76 and 82. The upper and lower horizontal flow passages 108, 110 communicate via transfer passages 116 defined between the forward ends 118 of the divider ribs 112 and the front insulation panel 86 (FIG. 5) which abuts the forward ends 114 of the side insulation panels 76 and 82.

The divider ribs 112 (FIG. 4) abut corresponding outwardly projecting rib portions 120 formed on the well sections 42 and 44, while upper and lower interior surface portions of the side panel 76 and 82 abut correspondingly curved outer side surface portion of the wells 42 and 44. As previously described, these side panels (like the front and rear end insulation panels) are firmly held in the positions shown by the metal jacket structure which surrounds the insulation panel system. It can be seen that, with the exception of the portions of the inlet passages 104 which extend laterally inwardly beyond the well sections 42 and 44, the various combustion gas flow passage portions just described are closed by and extend along various exterior surfaces of the well sections 42 and 44.

The lower horizontal flow passages 110 are extended rearwardly through the rear insulation panel 80 and open outwardly through correspondingly sized openings 122 (FIG. 7) formed through the rear metal jacket section 102. A suitable exhaust header box structure 124 is secured to the rear metal jacket section 102 over the openings 122 therein, and is provided with a vertically extending exhaust stack section 126.

By means of a gas fired dual radiant burner assembly disposed within the heating cavity 74 as subsequently described, hot combustion gas 130 is forced in opposite horizontal directions into the heating cavity 74 and impinges upon the laterally inwardly facing vertical surfaces 132 of the well sections 42 and 44 to transfer heat to the cooking oil through such well section surfaces. As best illustrated in FIG. 6, the combustion gas 130 is then forced rearwardly into the inlet passages 104 and then laterally outwardly therethrough along rear surface portions of the well sections. The combustion gas is then forced forwardly through the upper horizontal flow passages 108, downwardly through the transfer passages 116, and then rearwardly through the lower horizontal flow passages 110 and outwardly through the discharge openings 122 (FIG. 7) into the exhaust header 124 and upwardly through the exhaust stack 126. Accordingly, the hot combustion gas 130 is flowed in single passes along the interior side surfaces 132 of the wells 42 and 44, and along the rear surfaces of such wells, and then flowed in two separate passes along the exterior side surfaces 78 and 84 of the wells before ultimately being discharged to atmosphere.

It can be seen that the previously described insulation panel system functions not only to insulate the heated well sections of the frypot 12, but also defines with external surface portions of such wells the multi-pass combustion gas heating passageway system just described by means of the various surface recesses formed in the side and rear insulation panels. This unique definition of such combustion gas passageway system by the solid insulation panels significantly reduces the total amount of metal used in the illustrated frypot structure. In turn, this reduces both the weight and the cost of the frypot structure and reduces its overall mass. The reduction in overall mass significantly decreases the oil heating response time, which permits quicker heating of and better temperature control of the cooking oil disposed within the frypot.

The hot combustion gas 130 is forced into the heating cavity 74 by means of a dual radiant burner assembly 134 (FIG. 12) which is inserted into such cavity through the access opening 100 in the front metal jacket portion 98 and is positioned within the cavity 74 as illustrated in FIG. 4. The burner assembly 134 comprises a pair of generally conventional gas-fired radiant burners 136 and 138 having back-to-back hollow metal bodies 140 which have elongated rectangular configurations and are provided with fuel-air mixture supply tubes 142 extending through their interiors. Operatively secured to the laterally outwardly facing open sides of the burner bodies 140 are perforated ceramic burner face plate sections 144. A pair of mounting studs 146 extend outwardly from the forward end surfaces of each of the burner bodies 140 above and below their tubes 142 whose open inlet ends are flush with such end surfaces.

The burner bodies 140 are surrounded and insulated by four solid insulation panels 148, 150, 152 and 154 which are nested between outwardly projecting peripheral edge portions of the oppositely disposed ceramic plate sections 144 and respectively engage the upper, lower, front end, and rear end surfaces of the back-to-back burner bodies 140. These four insulation panels are suitably intersecured, and the front panel 152 is provided with openings 156 through which the mounting studs 146 extend, and a pair of larger openings 158 which are in registry with the open inlet ends of the burner tubes 142.

When inserted into the heating cavity 74 (see FIG. 4), the insulated burner assembly 134 extends vertically between the upper and lower insulation panels 62 and 88, with the laterally outer surfaces of the ceramic burner plates 144 being spaced horizontally inwardly from the well sidewall surfaces 132 and aligned with the laterally inner ends of the inlet passage portions 104 of the combustion gas passageway system. The burner assembly 134 also extends along essentially the entire front-to-rear length of the heating cavity 74. By means of a fuel-air mixture supply system 160 (FIG. 12) subsequently described, a gas-air mixture is forced through the burner tubes 142 into the burner bodies 140, and then outwardly through the perforated ceramic burner plates 144, the gas-air mixture exiting the plates 144 being ignited in a conventional manner creating an evenly distributed flame front which extends along the laterally facing outer side surfaces of the ceramic plate sections 144. The resulting hot combustion gas 130 is then forced through the combustion gas passageway system as previously described to very efficiently transfer heat through the well sections 42 and 42 into the frypot cooking oil.

Figure 8:
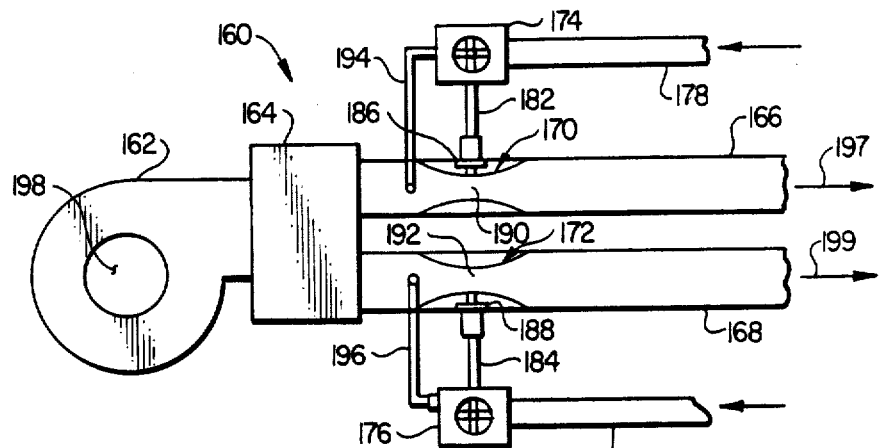
FIG. 8 is a simplified schematic diagram illustrating a portion of the air-gas mixture supply system for the apparatus.

Referring now to FIG. 8, the basic components of the fuel-air mixture supply system 160 (illustrated in simplified schematic form in FIG. 8) include an air blower 162 connected at its outlet to an air supply plenum 164, a pair of fuel-air mixture supply passages 166 and 168 which are interconnected between the supply plenum 164 and the burner supply tubes 142 of the burners 136 and 138, respectively, a pair of venturi sections 170 and 172 formed respectively within the supply passages 166 and 168, and a pair of negative gas pressure regulators 174 and 176.

The regulators 174, 176 are supplied with pressurized gas from a source thereof via suitable inlet pipes 178 and 80, and have outlet pipes 182, 184 connected to orifice fittings 186, 188 which respectively communicate with the central throat portions 190, 192 of the venturi sections 170, 172. Regulators 174, 176 are also provided with vent lines 194, 196 which have open outer ends that respectively communicate with higher pressure regions of the venturi sections 170, 172 slightly upstream from the central throat portions 190, 192 thereof. Each of the regulators 174, 176 is operative to deliver a supply of gas, via its outlet line, to its associated orifice at a pressure approximately 0.2" $H_2O$ less than the air pressure sensed within its vent line.

Use of the negative pressure regulators to supply a flow of pressurized gas into the venturi sections for mixture therein with the throughflow of pressurized air provides several unique advantages over conventional gas pressure regulation means utilized in previous fuel-air mixture supply systems for frypot burners.

To illustrate these operational advantages, the air and gas flow characteristics through the mixture passage 166 will be described and analyzed, the same principles, of course, also being applicable to the gas and air flow through the other mixture passage 168. For purposes of such analysis, it will be assumed that the normal operating air pressure within the supply plenum 164 is 3.0" $H_2O$, and that the normal operating pressure within the venturi throat portion 190 is approximately one third of the plenum pressure, or 1.0" $H_2O$. It will also be assumed that the open outlet end of the vent line 194 is positioned within the venturi section 170 upstream of the gas orifice 186 so that the pressure sensed within such vent line is approximately two thirds of that in the supply plenum 164, or approximately 2.0" H₂O, and that the supply pressure within the inlet pipe 178 is 2.0" H₂O.

With these criteria established, it can be seen that the regulated gas pressure within the gas outlet pipe 182 is 1.8" H₂O (the vent line pressure less 0.2" H₂O), and the gas pressure drop across the orifice 186 is 0.8" H₂O (which is equal to the orifice inlet pressure of 1.8" H₂O minus the venturi throat pressure of 1.0" H₂O). During operation of the blower 164, gas is forced through the orifice 186 into the venturi throat 190 for mixture therein with the air flowing therethrough to form a gas-air mixture stream 197 which is forced rightwardly through the mixture passage 166 (a similar mixture stream 199 being simultaneously flowed through the passage 168). This mixture has a predetermined air-gas ratio established by the selected size of the orifice 186 and the flow rate of the blower 162.

One of the longstanding problems associated with conventional gas-air mixture supply systems used to fire the burners of deep fat frying apparatus occurs when, for one reason or another, the blower outlet pressure, and thus its air flow rate, is reduced. This unwanted reduction in air flow rate may occur, for example, when a leak develops in the air supply plenum, or because of normal wear within the blower itself. In conventional fuel-air mixture supply systems, this reduction in air flow unavoidably results in a richer fuel-air mixture being delivered to the frypot burner or burners so that undesirable fuel wastage occurs.

This heretofore unavoidable mixture enrichment problem is obviated in the present invention by the unique use and venturi-connection of the negative pressure regulators 174 and 176. To illustrate the elimination of the undesirable fuel-air mixture enrichment caused by a reduction in the air delivery rate of the blower 162, it will be assumed, for purposes of analysis of the system 160, that the outlet pressure of the blower 162 drops by 10% so that the pressure within the supply plenum 164 accordingly drops from 3.0" H₂O to 2.7" H₂O. This plenum pressure drop correspondingly reduces the venturi throat pressure from 1.0" H₂O to 0.9" H₂O, and reduces the regulator vent line pressure from 2.0" H₂O to 1.8" H₂O. Since the air flow through the system 160 is proportional to the square root of the blower outlet pressure, the 10% blower outlet pressure reduction results in an air flow reduction to approximately 95% of its previously value. Stated otherwise, the air flow through the system 160 is reduced by approximately 5%.

The reduction in the regulator vent line pressure to 1.8" H₂O correspondingly reduces the gas pressure in the outlet pipe 182 to 1.6" H₂O. In turn, this reduces the gas pressure drop across the orifice 186 from 0.8" H₂O to 0.7" H₂O, an orifice pressure drop reduction of approximately 12.5% or, stated otherwise, a reduction in the orifice pressure drop to approximately 87.5% of its previously magnitude. Since the gas flow rate across the orifice 186 is proportional to the square root of the pressure drop across such orifice, the gas flow delivery rate into the venturi throat 190 is reduced to approximately 93.5% of its previous delivery rate, thus causing a gas flow rate decrease of approximately 6.5%.

Comparing the 5% air flow reduction to the 6.5% gas flow reduction it can be seen that, upon a representative 10% reduction in blower outlet pressure, the air-gas ratio of the mixture stream 197 being delivered via the mixture passage 166 to the burner 134 has been increased (i.e., mad "leaner") by approximately 1.5%. This relatively minor increase in the air-gas ratio of the mixture stream 197 is greatly preferable to the resulting fuel-wasting decrease in such ratio when conventional gas pressure regulator means are employed.

It can be seen that the use of the uniquely connected negative regulators 174, 176 causes the gas flow through the system 160 to very closely "follow" the air flow therethrough, the rather minor deviations in the "tracking" of the gas and air flows causing only a slight increase in the air-gas ratio instead of the more significant decrease in such ratio unavoidably resulting when conventional gas regulating systems are utilized.

Additionally, the use of the negative regulators 174, 176 in the system 160 provides a significant safety improvement—namely, in the absence of air flow through the system, no gas will be delivered thereto. Specifically, it can be seen that in the absence of air flow through the system, the regulator vent line 194 senses ambient pressure. Since the gas supply pressure in the outlet pipe 182 is regulated to a value less than the pressure sensed within the vent line 194, no gas will be delivered to the venturi throat 190 until air flow through the venturi creates a pressure differential between the inlet location of the vent line 194 and the outlet location of the orifice 186.

In conventional gas regulating systems used in conjunction with deep fat frying apparatus, this "no air-no gas" condition is typically achieved by supplying the gas into the inlet 198 of the blower 162, a gas delivery format requiring the blower 162 to be of an explosion proof construction. This necessity is, of course, eliminated in the system 160 due to the positioning of the gas supply location downstream from the blower 162. It should also be noted that, during operation of the blower 162, the pressures within the venturi throat 190, and at the vent line inlet location within the venturi, are both positive. Accordingly, there is simply no need to provide a negative pressure gas inlet point.

Importantly, despite the fact that the gas delivery point is at a positive pressure of approximately 1.0" H₂O during normal blower operation, the system 160 is operative at main gas supply pressure (to the inlet pipes 178 and 180) as low as approximately 2.0" H₂O. While the normal natural gas available supply pressure in this country is usually at least 4.0" H₂O, in many underdeveloped countries only "manufactured" gas is available, such manufactured gas typically having an available pressure as low as 2.0" H₂O. It can thus be seen that the schematically illustrated system 160 significantly expands the operational usefulness of the gas-fired frying apparatus 10.

It can also be readily seen that the system 160 advantageously utilizes a single blower to fire multiple frypot burners, two separate combustion paths being defined by the mixture passages 166 and 168. This feature further reduces the overall construction cost of the improved frying apparatus of the present invention.

Figure 9:
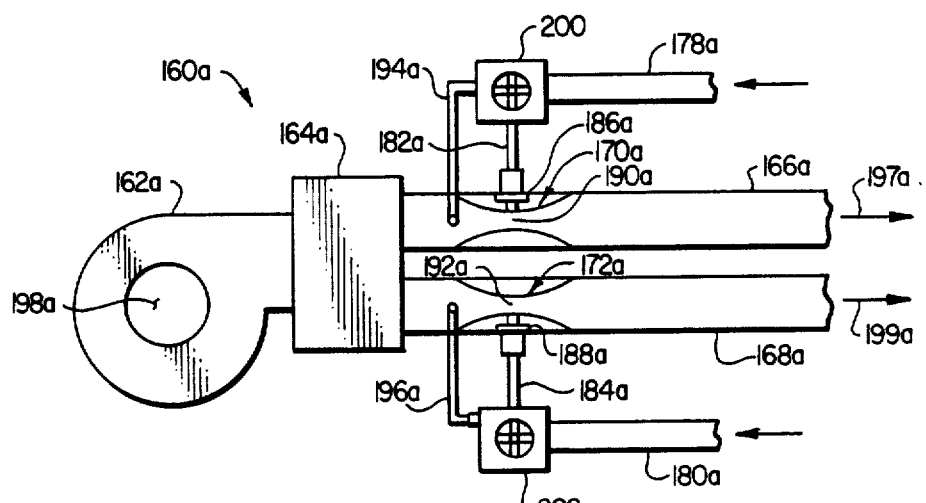
FIG. 9 is a simplified schematic diagram illustrating an alternate embodiment of the air-gas mixture supply system.

Schematically depicted in FIG. 9 is a modified mixture supply system $160_a$ in which components similar to those in the previously described system 160 have been given the same reference numerals, but with the subscripts "a". The system $160_a$ is identical to the previously described system 160 with the exception that instead of the negative gas regulators 174 and 176, a pair of zero gas pressure regulators 200 and 202 are utilized, the regulators 200 and 202 being connected to the venturi sections $170_a$ and $172_a$ in a manner identical to the connection of the regulators 174, 176 to the venturi sections 170, 172.

In operation, the regulators 200, 202 respectively regulate the gas pressures within the outlet pipes $182_a$, $184_a$ to pressures identical to those sensed in the vent lines $194_a$, $196_a$. The use of the zero pressure regulators 200, 202 provides the operational advantages previously described in conjunction with the negative pressure regulators 174, 176 and also at least potentially provides a further advantage—namely, the maintenance of constant air-fuel ratios in the mixture flows 197 and 199 regardless of outlet pressure fluctuations in the blower $162_a$.

To demonstrate these operational advantages, it will be assumed that the initial outlet pressure of the blower $162_a$ is 3.0" $H_2O$ so that the initial pressure in the venturi throat $190_a$ is 1.0" $H_2O$, the initial pressure in the vent line $194_a$ is 1.8" $H_2O$, the initial gas supply pressure within the gas outlet pipe $182_a$ is 1.8" $H_2O$, and the initial gas pressure in the blower outlet 2.7" $H_2O$), the air flow through the passage $166_a$ decreases by 5% the venturi throat pressure is reduced to 0.9" $H_2O$, the vent pressure and the gas supply pressure at the orifice both drop to 1.62" $H_2O$, and the gas pressure drop across the orifice $186_a$ is reduced to 0.72" $H_2O$.

Since the pressure drop across the orifice $186_a$ has been reduced to 90% of its previous value, the gas flow rate into the venturi throat $190_a$ (which is proportional to the square root of the pressure drop across the orifice) is reduced to 95% of its previous level or, stated otherwise, drops by 5%—a reduction equal to the air flow rate reduction percentage. Accordingly, the zero pressure regulators 200, 202 function to maintain a constant air-gas ratio in each of the mixture streams 197 and 199. Additionally, in theory at least, there can be no gas flow into either of the venturi throats $190_a$, $192_a$ in the absence of air flow through such venturis.

The achievement of these two particular operational advantages is, of course, predicated upon the assumption that the pressures in the outlet pipe $182_a$ and the vent line $194_a$ are identical. As is well known, however, in conventional zero pressure gas regulators, there is typically a variance between these two pressures of as much as +0.2" $H_2O$. The presence of this potential deviation between the two pressures at least to some degree denegrates the previously described exact "tracking" of the air and gas delivery rates when the blower outlet pressure fluctuates. Additionally, such operational inaccuracies of typical zero pressure regulators can also obviate the "no air—no gas" operational flow characteristics. These potential practical limitations can, of course, be essentially overcome by providing larger and more accurate zero pressure regulators which maintain quite precise equality between the vent and outlet pressures therein. However, this can considerably increase the cost of the system $160_a$.

Accordingly, it is currently preferred to utilize the previously described system 160 with its negative pressure regulators 174 and 176. Because these negative pressure regulators are designed to operate with a pressure differential between their vent and gas supply pressures, the potential occurrence of gas inlet flow without corresponding air supply flow is effectively eliminated.

Figure 11:
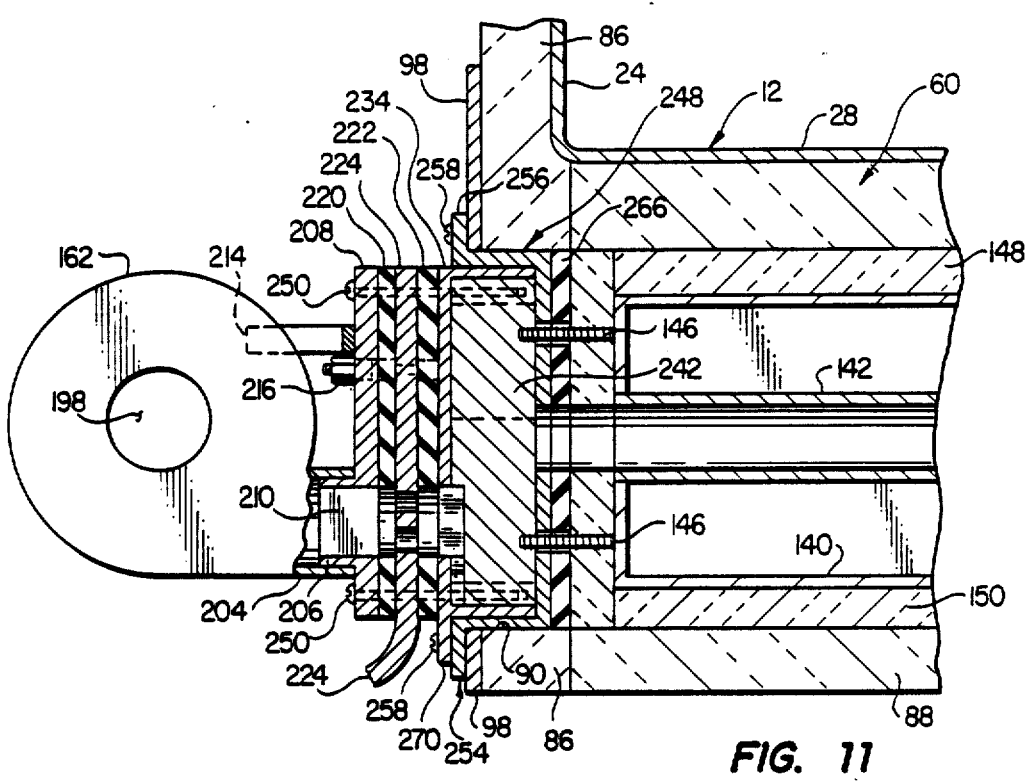
FIG. 11 is an enlarged scale partial cross-sectional view through the deep fat frying apparatus, taken along line 11—11 of FIG. 1, illustrating the mixture supply system in assembled form, and a portion of the adjacent frypot burner assembly.
Figure 12:
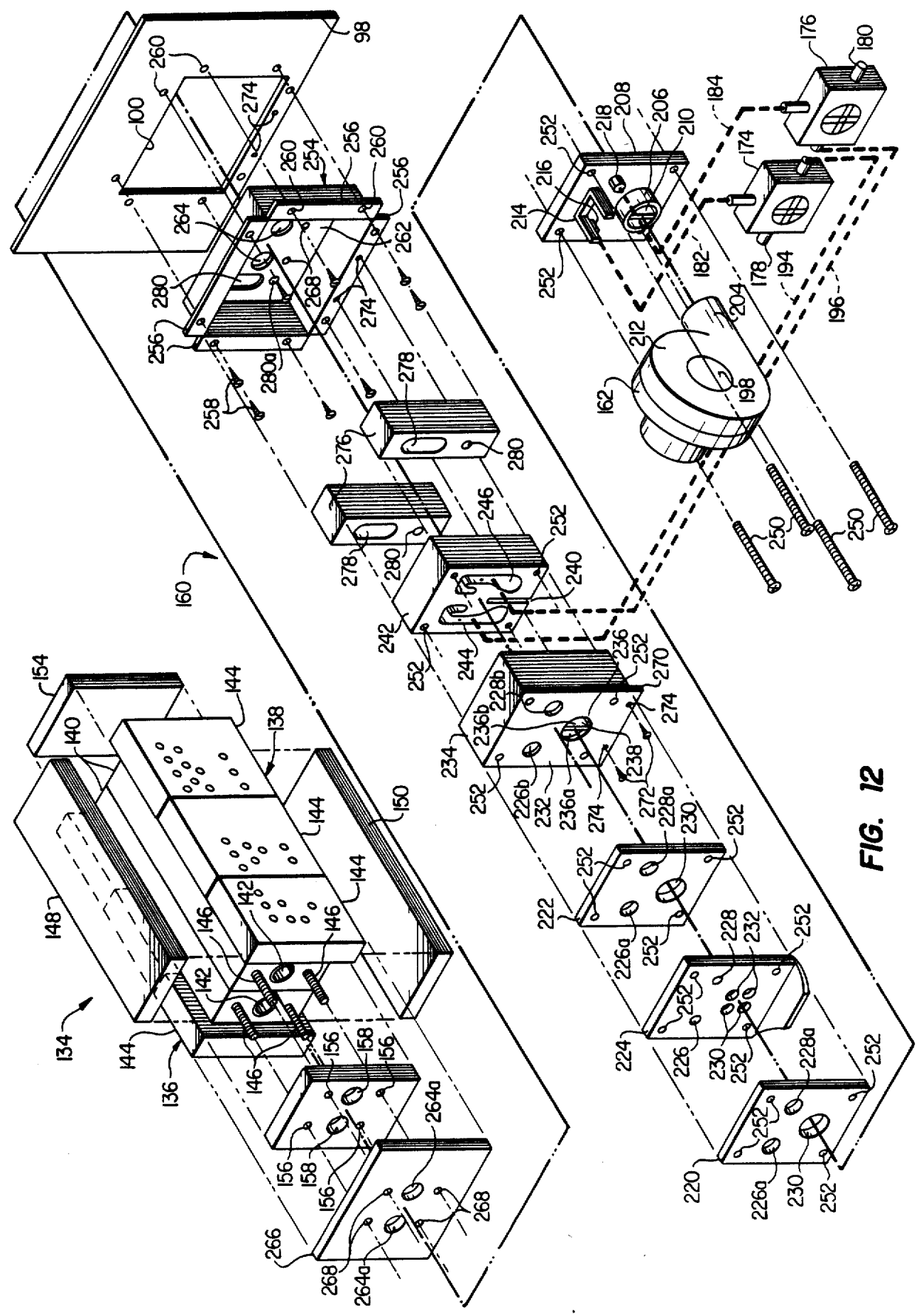
FIG. 12 is an enlarged scale exploded perspective view of the mixture supply system and the frypot burner assembly to which it is connected.

The actual structural embodiment of the schematically depicted mixture supply system 160 of FIG. 8 will now be described in detail with reference to FIGS. 11 and 12. As will be seen, in addition to the previously described operational advantages thereof, the air-gas mixture supply system 160 has incorporated therein a variety of unique structural features which represent significant improvements over conventional mixture supply systems.

The outlet 204 of the blower 162 is operatively connected to an air inlet collar 206 suitably secured to a rectangular blower mounting plate 208, the collar 206 being divided into two equal, side-by-side portions by a vertically extending divider plate 210 positioned therein. An upper portion 212 of the blower 162 is secured to the mounting plate 208 by means of a suitable bracket 214 affixed thereto. Also secured to the mounting plate 208 are a pair of gas inlet fittings 216 and 218 to which the gas outlet lines 182, 184 of the negative pressure gas regulators 174, 176 are respectively connected. Positioned behind the mounting plate 208, and sandwiched between a pair of gasket members 220 and 222, is an interchangeable fuel and air orifice plate 224. The orifice plate 224 is provided with a pair of gas orifice openings 226 and 228 which are respectively aligned with the outlets of the gas inlet fittings 216 and 218, and are further aligned with corresponding, somewhat larger openings $226_a$ and $228_a$ formed in the gaskets 220 and 222. Also formed in the orifice plate 224 are two side-by-side vertical pairs of air orifice openings 230 and 232, each of the opening pairs 230, 232 being positioned on an opposite side of the divider plate 210 in the air inlet collar 206. These four air orifice openings are circumscribed by larger single openings 230 formed through the gaskets 220 and 222.

During operation of the mixture supply system 160, air discharged from the blower 162 is separated by the divider plate 210 in the air inlet collar 206 into two separate flow streams which are respectively flowed through the air orifice opening pairs 230 and 232. In a similar fashion, gas discharged from the regulators 174, 176 via the supply lines 182, 184 is forced through the gas orifice openings 226, 228 in the orifice plate 224. It can be seen that by appropriately correlating the sizes of the air orifices 230, 232 and the gas orifices 226, 228 (which serve as the gas supply orifices 186 and 188 schematically depicted in FIG. 8), a predetermined air-fuel ratio may be achieved in the mixture streams 197 and 199 (FIG. 8). Such air-gas mixture ratio may be quickly, easily and accurately varied, without the necessity of altering the air delivery rate of the blower 162, simply by removing the orifice plate 224 and replacing it with another orifice plate having differently sized air and gas orifice openings formed therethrough.

The rear orifice plate gasket 222 abuts the front wall 232 of a metal retaining box 234, the front wall 232 having formed therethrough a circular opening 236 which registers with the opening 230 of the gasket 222, and a pair of circular openings $226b$ and $228b$ which respectively register with the gas flow openings $226_a$, $228_a$ in the gasket 222. A metal divider panel 238 divides the retaining box air opening 236 into two side-by-side portions $236_a$ and $236_b$ and is received in a vertically extending notch 240 formed in the front surface of a plenum and venturi block 242 which is positioned within the retaining box 234. The block 242 is formed from a solid insulation material similar to that utilized in the various insulation panels previously described in conjunction with the frypot 12. Extending through the block 242 on opposite sides of the vertical notch 240 are a pair of curved openings 244 and 246. As will be seen, the block 242 uniquely performs two functions-namely, it serves to insulate a front portion of the frypot 12, and further defines the air supply plenum 164, the venturi sections 170 and 172, and portions of the mixture supply passages 166, 168 schematically depicted in FIG. 8.

Figure 13:
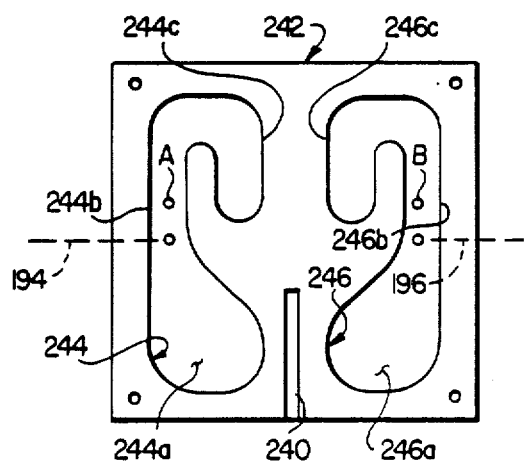
FIG. 13 is an enlarged scale front elevational view of a plenum and venturi block portion of the mixture supply system.

Referring now to FIG. 13, the block openings 244, 246 have relatively large bottom side portions 244$_a$ and 246$_a$ which combinatively define the air supply plenum 164 (FIG. 8) and are respectively disposed immediately behind the retaining box opening portions 236$_a$ and 236$_b$, narrowed central portions 244$_b$ and 246$_b$ which respectively define the venturi sections 170, 172 (FIG. 8), and widened upper side portions 244$_c$ and 246$_c$ which communicate with the outlet ends of such venturi sections. As illustrated in FIGS. 11 and 12, the elements 208, 220, 224, 222, 234 and 242 are intersecured in generally laminated fashion to form a system subassembly 248 (FIG. 11) by means of suitable elongated fastening members 250 which extend through aligned connection openings 252 formed in the elements of such subassembly.

Figure 10:
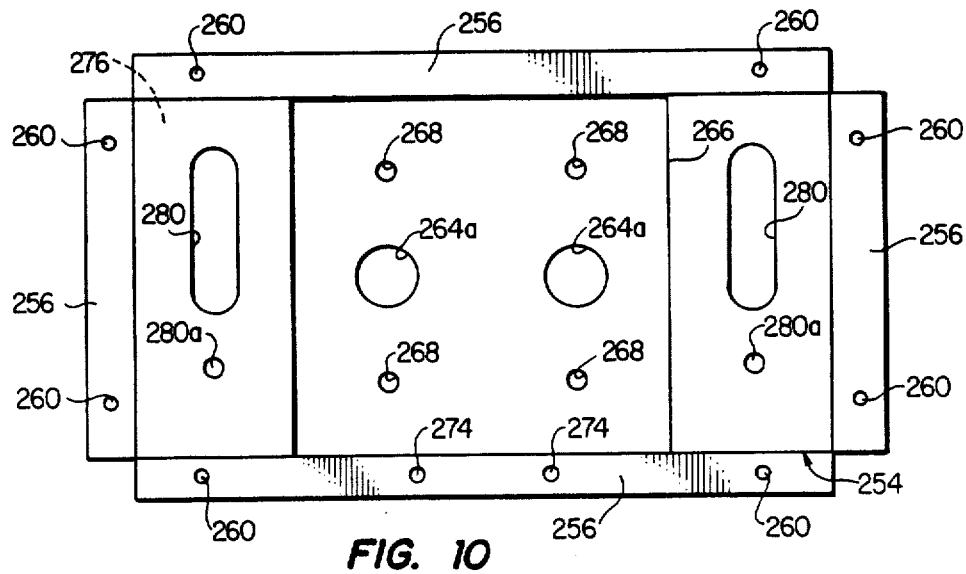
FIG. 10 is an enlarged scale rear elevational view of a metal well portion of the supply system, and an associated burner end gasket.

The subassembly 248 is rearwardly received within a laterally central portion of a rectangularly configured metal well 254 which is closely received within and projects rearwardly beyond the access opening 100 formed in the front metal insulation retaining jacket portion 98. Along its four front edges, the well 254 is provided with attachment tabs 256 which are secured to the jacket portion 98 by means of suitable fastening elements 258 that extend through aligned openings 260 formed through the tabs 256 and the jacket portion 98. The inner end wall 262 or the well 254 has formed therethrough a pair of circular air-gas mixture inlet openings 264 which are aligned with the inlet openings of the burner tubes 142 and with the upper side portions 244$_c$ and 246$_c$ of the venturi block openings 244 and 246. Interposed between the forward end of the insulated burner assembly 134 and the inner end wall 262 of the well 254 is a burner end gasket 266 (see also FIG. 10) which is laterally centered on the well end wall 262 and is of the same size and shape as the rear side surface of the venturi block 242. The burner gasket 266 is provided with circular openings 264$_a$ which register with the well inlet openings 264. The burner mounting studs 146 extend through aligned openings 268 formed in the gasket 266 and the well end wall 262, and are suitably connected to the venturi block 242. The metal retaining box 234 is provided with a downwardly extending connection tab 270 which is secured to the downwardly projecting tab 256 on the well 254 by means of suitable fastening elements 272 that are extended through aligned mounting holes 274 formed in the tab 270, the lower tab 256 of the well 254, and the retaining jacket portion 98.

Received within the well 254 on opposite sides of the metal retaining box 234 are a pair of internally insulated igniter boxes 276. Each of the insulated boxes 276 is provided with an igniter opening 278 which is aligned with corresponding openings 280 formed through the well end wall 262 and is adapted to receive a conventional ignitor element (not illustrated) which is utilized to light the flame on the exterior side surface of one of the perforated ceramic burner plates 144. The igniter boxes 276 are also provided with small sight openings 280 which are aligned with corresponding openings 280$_a$ in the well end wall 262 and are used to view the conditions of the burner flames within the heating cavity 74.

During operation of the mixture supply system, the dual air streams flowing through the metal box openings portions 236$_a$ and 236$_b$ are forced into the air plenum portions 244$_a$ and 246$_a$ of the venturi block openings 244 and 246. Simultaneously, the gas streams flowing through the metal retaining box gas openings 226$_b$ and 228$_b$ are forced into central throat portions (at points A and B) of the venturi sections 244$_b$ and 246$_b$ of the venturi block openings 244 and 246. As schematically illustrated in FIG. 13, the open inlet ends of the regulator vent lines 194 and 196 are suitably communicated with such venturi sections at points therein slightly upstream of gas inlet points A and B (in a manner similar to that described in conjunction with the schematic mixture supply system depicted in FIG. 8). The air and gas traversing the venturi sections 244$_b$ and 246$_b$ of the venturi block openings 244 and 246 is forced into and mixed within the upper side portions 244$_c$ and 246$_c$ of such openings, and is then ejected from the venturi block 242 in the form of the previously described mixture streams 197 and 199. These mixture streams are then sequentially forced through the openings 264, 264$_a$ and 158 of the metal well 254, the burner end gasket 266 and the burner front end insulation block 152 into the burner tubes 142.

It can be seen that the unique structure of the mixture supply system 160 permits it to be easily and relatively rapidly assembled and disassembled for repair and adjustment purposes. Similarly, it should be noted that the insulated burner assembly, which is secured to the mixture supply system 160, may be easily inserted through the jacket opening 100 into the heating cavity 74 as similarly withdrawn through such opening 100 for inspection and/or repair purposes.

While the provision of the interchangeable fuel and air orifice plate 224, and its associated supporting structure, permits the rapid and very accurate modification of the air-fuel ratio of the combustion mixture streams supplied to the burner assembly, such mixture adjustment structure may be eliminated if desired and the supply system 160 modified accordingly to provide a somewhat different mixture adjustment format.

Figure 14:
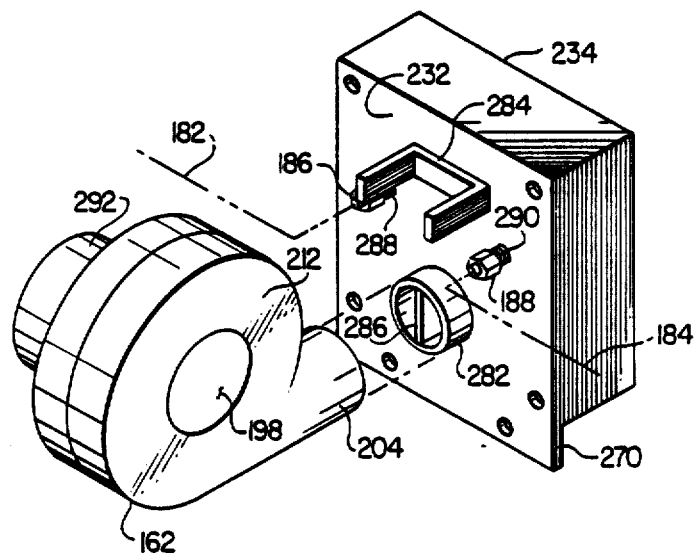
FIG. 14 is an enlarged scale exploded perspective view of a modified portion of the mixture supply system.

Referring to FIG. 14, this modification may be achieved by eliminating the previously described blower mounting plate 208, the orifice plate 224, and its associated gaskets 220 and 222, and connecting the blower 162 directly to the metal retaining box 234. This alternate connection of the blower 162 is effected by providing the front end wall 232 of the retaining box 234 with a blower inlet collar 282 to which the outlet 204 of the blower is connected, and a mounting bracket 284 which is operatively connected to the upper portion 212 of the blower. As in the case of the air inlet collar 206, the collar 282 is provided with a divider plate 286 which is received within the slot 240 of the venturi block (not illustrated in FIG. 14) which is housed within the modified retaining box 234. The front wall 232 of the modified retaining box 234 has operatively connected thereto a pair of gas inlet fitting 288 and 290 which are respectively connected to the gas orifices 186 and 188. To selectively alter the air-gas ratio of the combustion mixture supplied to the burner assembly, the blower 162 may be provided with a variable speed motor 292 to selectively vary the overall air flow through the mixture supply system 160.

It can be seen from the foregoing that the deep fat frying apparatus 10 of the present invention in several regards provides significant structural and operational advantages over conventional fuel-fired deep fat fryers. For example, because the frypot 12 is formed using the previously described combination deep draw-shallow draw process, all of its interior corner portions are radiused—a feature which greatly facilitates the cleaning of the frypot and improves the sanitation thereof during use.

Additionally, the provision of the integral shortening melter 60, which may be operated independently of the main frypot oil heating system, advantageously converts the initial shortening process to a "hands off" operation which is more energy efficient, requires far less supervision, and is considerably safer than conventional melting techniques.

The unique use of the lightweight solid insulation panels to both insulate and define-the combustion gas heating passageway system for the well sections of the frypot significantly reduces the overall mass of the frypot structure, improves the fuel efficiency of its heating system, reduces the oil heating response time, provides for more precise temperature control of the cooking oil, and reduces the overall cost of the frypot structure.

The energy efficiency of the frypot is further enhanced by the non-positive, venturi-connected gas regulation system incorporated in the air-gas mixture supply system which prevents undesirable mixture enrichment in the event that the air supply rate to the system is reduced. Control of the mixture air-gas ratio is further improved by the use of the previously described interchangeable fuel and gas orifice plate.

With its generally laminated construction the mixture supply system is quite rugged, compact, relatively inexpensive to produce, and easy to assemble and disassemble. The compactness of the mixture supply system is enhanced by the unique plenum and venturi block portion thereof which simultaneously functions to insulate a portion of the frypot structure and to define the plenum, venturi and gas-air mixture portions of the supply system.

The foregoing detailed description is to be clearly understood as being given by way of illustration and example only, the spirit and scope of the present invention being limited solely by the appended claims.

What is claimed is:

1. Deep fat frying apparatus comprising:
   a frypot adapted to hold a quantity of cooking oil and having a wall surface portion through which heat may be transferred to heat the oil;
   a solid insulating material structure positioned against said wall surface portion and having an insulating material side surface portion which directly defines with said wall surface portion a heating flow passage adapted to receive a heated gas and flow the heated gas along said wall surface portion;
   retaining means for holding said solid insulating material structure against said wall surface portion; and
   gas generating means for flowing heated gas into said heating flow passage.

2. The apparatus of claim 1 wherein:
   said solid insulating material structure includes at least one insulation panel abutting said wall surface portion and having an interior surface depression formed therein which is covered by said wall surface portion and defines therewith a portion of said heating flow passage.

3. The apparatus of claim 1 wherein:
   said solid insulating material structure is formed from a ceramic fiber material.

4. The apparatus of claim 1 wherein:
   said retaining means comprise a retaining jacket structure extending outwardly around said solid insulating material structure.

5. The apparatus of claim 1 wherein:
   said gas generating means include burner means for receiving and burning an air-fuel mixture and responsively generating hot combustion gas for flow into and through said heating flow passage, and an air-fuel mixture supply system for selectively flowing an air-fuel mixture into said burner means.

6. The apparatus of claim 5 wherein:
   said air-fuel mixture supply system includes blower means for supplying a flow of pressurized air, wall means defining an air-fuel flow passage extending between said blower means and said burner means, a venturi section operatively interposed in said air-fuel flow passage and having a throat portion, and gas pressure regulator means having an inlet for receiving pressurized gaseous fuel from a source thereof, a regulated pressure gas outlet line communicating with said throat portion of said venturi section, and a vent line communicating with said venturi section at a location therein having a pressure higher than the pressure in said throat portion during air flow through said venturi section.

7. The apparatus of claim 6 wherein:
   said gas pressure regulator means include a zero gas pressure regulator.

8. The apparatus of claim 6 wherein:
   said gas pressure regulator means include a negative gas pressure regulator.

9. The apparatus of claim 1 wherein:
   said frypot has interior corner portions and is defined by an upper section deep-drawn from a single sheet of metal, and at least one well section depending from said upper section and formed from a duality of shallow-drawn metal sections which are welded to each other and to said upper section, each of said interior corner portions being radiused and devoid of weld lines.

10. Deep fat frying apparatus comprising:
    a frypot adapted to hold a quantity of cooking oil and having a wall surface portion through which heat may be transferred to heat the oil, said frypot having an upper section having a bottom wall, and at least one well section depending from said bottom wall;
    a solid insulating material structure positioned against said wall surface portion and defining therewith a heating flow passage adapted to receive a heated gas and flow the heated gas along said wall surface;
    retaining means for holding said solid insulating material structure against said wall surface portion;
    gas generating means for flowing heated gas into said heating flow passage; and
    shortening melter means extending along the outer surface of said bottom wall and selectively operable to melt a quantity of solid shortening disposed in said upper section and resting upon said bottom wall.

11. The apparatus of claim 10 wherein:
    said shortening melter means include an insulating member positioned against said outer surface of said bottom wall, and heating coil means imbedded in an upper surface portion of said insulating member.

12. Deep fat frying apparatus comprising:

a frypot adapted to hold a quantity of cooking oil and having an upper section with a bottom wall, and first and second laterally spaced hollow well sections depending from said bottom wall and internally defining downward continuations of the interior of said upper section;

insulating material enveloping portions of said well sections and defining therebetween a heating cavity, said insulating material having a section which abuts exterior surface portions of said well sections and defines therewith a heating flow passage system adapted to receive hot combustion gas from a source thereof and flow the received gas along said exterior surface portions to heat cooking oil disposed within said well sections;

burner means, positioned within said heating cavity, for receiving an air-fuel mixture from a source thereof, burning the received mixture, and responsively generating hot combustion gas for receipt by and flow through said heating flow passage system;

mixture supply means for combining pressurized flows of air and fuel from sources thereof to form said air-fuel mixture and deliver the same to said burner means; and regulating means for controlling said flow of fuel in a manner preventing appreciable enrichment of said air-fuel mixture in response to an air flow rate reduction in said mixture supply means.

13. Deep fat frying apparatus comprising:

a frypot adapted to hold a quantity of cooking oil and having an upper section with a bottom wall, and first and second laterally spaced hollow well sections depending from said bottom wall and internally defining downward continuations of the interior of said upper section;

insulating material enveloping portions of said well sections and defining therebetween a heating cavity, said insulating material having a section which abuts exterior surface portions of said well sections and defines therewith a heating flow passage system adapted to receive hot combustion gas from a source thereof and flow the received gas along said exterior surface portions to heat cooking oil disposed within said well sections;

burner means, positioned within said heating cavity, for receiving an air-fuel mixture from a source thereof, burning the received mixture, and responsively generating hot combustion gas for receipt by and flow through said heating flow passage system;

mixture supply means for combining pressurized flows of air and fuel from sources thereof to form said air-fuel mixture and deliver the same to said burner means;

regulating means for controlling said flow of fuel in a manner preventing appreciable enrichment of said air-fuel mixture in response to an air flow rate reduction in said mixture supply means; and shortening melter means, extending along said bottom wall of said frypot within said heating cavity, for heating said bottom wall to melt a quantity of solid shortening disposed in said upper frypot section and resting upon said bottom wall.

14. The apparatus of claim 13 wherein:

said shortening melter means include an insulating member positioned against said bottom wall, and heating coil means imbedded in an upper surface portion of said insulating member.

15. The apparatus of claim 12 wherein:

said upper frypot section is deep-drawn from a single sheet of metal, and said frypot well sections are formed from intersecured lateral portions each shallow-drawn from a single sheet of metal.

16. Deep fat frying apparatus comprising:

a frypot adapted to hold a quantity of cooking oil and having an upper section with a bottom wall, and first and second laterally spaced hollow well sections depending from said bottom wall and internally defining downward continuations of the interior of said upper section;

insulating material enveloping portions of said well sections and defining therebetween a heating cavity, said insulating material having a section which abuts exterior surface portions of said well sections and defines therewith a heating flow passage system adapted to receive hot combustion gas from a source thereof and flow the received gas along said exterior surface portions to heat cooking oil disposed within said well sections;

burner means, positioned within said heating cavity, for receiving an air-fuel mixture from a source thereof, burning the received mixture, and responsively generating hot combustion gas for receipt by and flow through said heating flow passage system;

mixture supply means for combining pressurized flows of air and fuel from sources thereof to form said air-fuel mixture and deliver the same to said burner means; and regulating means for controlling said flow of fuel in a manner preventing appreciable enrichment of said air-fuel mixture in response to an air flow rate reduction in said mixture supply means, said insulating material including a pair of generally parallel first and second solid insulation panel sections extending along laterally oppositely facing side wall surfaces of said well sections, and a third solid insulation panel section extending between end portions of said first and second panel sections and defining a lateral boundary of said heating cavity, and said heating flow passage system including a pair of inlet portions formed in said third panel section and communicating with the interior of said heating cavity, a pair of first passage portions communicating with said inlet portions and extending away from said inlet portions generally horizontally along said oppositely facing side wall surfaces of said well sections, and a pair of second passage portions communicating with said first passage portions, extending toward said third panel section generally horizontally along said oppositely facing side wall surfaces of said well sections and opening outwardly through said third panel section.

17. The apparatus of claim 16 wherein:

said insulating material is a ceramic fiber material.

18. The apparatus of claim 16 wherein:

said insulating material further includes a fourth solid insulation panel section spaced apart from said third panel section, extending between opposite end portions of said first and second panel sections, and defining a lateral boundary of said heating cavity, said fourth panel section having an opening formed therethrough, and said mixture supply means extend through said opening in said fourth panel section and are connected to said burner means.

19. The apparatus of claim 12 wherein:

said burner means include first and second gas burners positioned in a back-to-back relationship within said heating cavity and having outlet portions facing and spaced apart from facing side wall surfaces of said well sections, and said mixture supply means extend inwardly through said insulating material, are connected to said first and second burners, and include:

an air blower having an outlet, air supply plenum means connected to said a first mixture passage interconnected between said air supply plenum means and said first burner, a second mixture passage interconnected between said air supply plenum means and said second burner, a first venturi section operatively interposed in said first mixture passage and having an upstream end portion, a central throat portion adapted to receive a portion of said flow of fuel, and a downstream end portion, a second venturi section operatively interposed in said second mixture passage and having an upstream end portion, a central throat portion adapted to receive a portion of said flow of fuel, and a downstream end portion.

20. The apparatus of claim 19 wherein:

said regulating means include a pair of gas pressure regulators each having an inlet adapted to receive pressurized gaseous fuel from a source thereof, an outlet communicating with one of said central throat portions of said first and second venturi sections, and a vent communicating with one of said upstream end portions of said first and second venturi sections.

21. The apparatus of claim 20 wherein:

said gas pressure regulators are zero gas pressure regulators.

22. The apparatus of claim 20 wherein:

said gas pressure regulators are negative gas pressure regulators.

23. The apparatus of claim 19 wherein:

said mixture supply means include an insulation member which defines a portion of said insulation material and has a pair of openings formed through which define said air supply plenum means, said first and second venturi sections, and portions of said first and second mixture passages.

24. The apparatus of claim 23 further comprising:

interchangeable fuel and air orifice plate means, removably interposed between said blower outlet and said insulation member, for restricting said flows of air and fuel to establish a predetermined air-fuel ratio in each of the air-fuel mixtures traversing said first and second mixture passages.

25. Deep fat frying apparatus comprising:

a frypot adapted to hold a quantity of cooking oil and having an upper section with a bottom wall, and first and second laterally spaced hollow well sections depending from said bottom wall and internally defining downward continuations of the interior of said upper section;

insulating material enveloping portions of said well sections and defining therebetween a heating cavity, said insulating material having a section which abuts exterior surface portions of said well sections and defines therewith a heating flow passage system adapted to receive hot combustion gas from a source thereof and flow the received gas along said exterior surface portions to heat cooking oil disposed within said well sections;

burner means, positioned within said heating cavity, for receiving an air-fuel mixture from a source thereof, burning the received mixture, and responsively generating hot combustion gas for receipt by and flow through said heating flow passage system;

mixture supply means for combining pressurized flows of air and fuel from sources thereof to form said air-fuel mixture and deliver the same to said burner means; and regulating means for controlling said flow of fuel in a manner preventing appreciable enrichment of said air-fuel mixture in response to an air flow rate reduction in said mixture supply means;

said burner means including first and second gas fired burners each having an inlet opening, and said mixture supply means including:

an air blower having an outlet, a blower mounting plate supporting said air blower, said blower mounting plate having an air inlet collar connected to said blower outlet and divided into first and second two flow sections, and first and second gas inlet fittings adapted to receive flows of pressurized gaseous fuel from a source thereof, an interchangeable fuel and air orifice plate positioned behind said blower mounting plate and having first and second gas orifice openings respectively aligned and communicating with said first and second gas inlet fittings, and first and second air orifice openings respectively aligned and communicating with said first and second flow sections of said air inlet collar, a retaining box positioned behind said orifice plate and having a front wall with an air flow opening and first and second gas flow openings formed therethrough, said air flow opening being divided into first and second flow sections respectively aligned and communicating with said first and second air orifice openings, a plenum-venturi element positioned in said retaining box and having first and second flow passages formed therethrough, each of said flow passages having a plenum portion communicating with one of said first and second flow sections of said air flow opening in said retaining box, a mixture portion, and a venturi portion interposed between said plenum and mixture portions and having a central throat section, communicating with one of said first and second gas flow openings in said retaining box, a well member extending through said insulating material and receiving said retaining box, said well member having first and second mixture openings formed therethrough which are respectively aligned and communicated with said inlet openings of said first and second burners and said mixture portions of said first and second flow passages of said plenum-venturi element, means for intersecuring said burners to said plenum-venturi element, and means for intersecuring said blower mounting plate, said fuel and air orifice plate, said retaining box and said plenum-venturi element.

26. The apparatus of claim 25 wherein:

said regulating means include first and second gas pressure regulators each having an inlet adapted to receive pressurized gaseous fuel from a source thereof, an outlet connected to one of said gas inlet fittings, and a vent connected to one of said venturi portions.

27. The apparatus of claim 26 wherein:

said gas pressure regulators are zero gas pressure regulators.

28. The apparatus of claim 26 wherein:

said gas pressure regulators are negative gas pressure regulators.

29. The apparatus of claim 25 wherein:

said plenum-venturi element is a block of solid insulating material and defines a portion of said insulating material which envelopes portions of said well sections.

30. Deep fat frying apparatus comprising:

a frypot adapted to hold a quantity of cooking oil and having an upper section with a bottom wall, and first and second laterally spaced hollow well sections depending from said bottom wall and internally defining downward continuations of the interior of said upper section;

insulating material enveloping portions of said well sections and defining therebetween a heating cavity, said insulating material having a section which abuts exterior surface portions of said well sections and defines therewith a heating flow passage system adapted to receive hot combustion gas from a source thereof and flow the received gas along said exterior surface portions to heat cooking oil disposed within said well sections;

burner means, positioned within said heating cavity, for receiving an air-fuel mixture from a source thereof, burning the received mixture, and responsively generating hot combustion gas for receipt by and flow through said heating flow passage system;

mixture supply means for combining pressurized flows of air and fuel from sources thereof to form said air-fuel mixture and deliver the same to said burner means; and regulating means for controlling said flow of fuel in a manner preventing appreciable enrichment of said air-fuel mixture in response to an air flow rate reduction in said mixture supply means, said burner means including first and second gas fired burners each having an inlet opening, and said mixture supply means including:

an air blower having an outlet;

a retaining box having an air inlet collar connected to said blower outlet and divided into first and second flow sections, and first and second orificed gas inlet fittings adapted to receive flows of pressurized gaseous fuel from a source thereof, a plenum-venturi element positioned in said retaining box and having first and second flow passages formed therethrough, each of said flow passages having a plenum portion communicating with one of said first and second flow sections, a mixture portion, and a venturi portion interposed between said plenum and mixture portions and having a central throat section communicating with one of said orificed gas inlet fittings, a well member extending through said insulating material and receiving said retaining box, said well member having first and second mixture openings formed therethrough which are respectively aligned and communicated with said inlet openings of said first and second burners and said mixture portions of said first and second flow passages of said plenum-venturi element, means for intersecuring said burners to said plenum-venturi element, and means for intersecuring said retaining box and said plenum-venturi element.

31. The apparatus of claim 30 wherein:

said regulating means include first and second gas pressure regulators each having an inlet adapted to receive pressurized gaseous fuel from a source thereof, an outlet connected to one of said gas inlet fittings, and a vent connected to one of said venturi portions.

32. The apparatus of claim 31 wherein:

said gas pressure regulators are zero gas pressure regulators.

33. The apparatus of claim 31 wherein:

said gas pressure regulators are negative gas pressure regulators.

34. The apparatus of claim 30 wherein:

said plenum-venturi element is a block of solid insulating material and defines a portion of said insulating material which envelopes portions of said well sections.

35. A supply system for flowing an air-fuel mixture to a burner adapted to supply heat to cooking oil disposed within the frypot section of a deep fat fryer, comprising:

an air blower having an outlet;

an air supply plenum communicating with said outlet of said air blower;

a venturi section positioned downstream from and communicating with said air supply plenum, said venturi section having an upstream end portion, a central throat portion, and a downstream end portion;

a mixture passage extending between said downstream end portion of said venturi section and the inlet of said burner; and fuel supply means for injecting fuel into said central throat portion of said venturi section during flow of pressurized air therethrough to form an air-fuel mixture delivered to said burner through said mixture passage, and for regulating the pressure of fuel injected into said central throat portion of said venturi section in a manner preventing appreciable enrichment of said air-fuel mixture in response to a reduction in the outlet pressure of said air blower.

36. The supply system of claim 35 wherein:

said fuel supply means include a gas pressure regulator having an inlet adapted to receive pressurized gas from a source thereof, an outlet communicating with said central throat portion of said venturi section, and a vent opening communicating with said upstream end portion of said venturi section.

37. The supply system of claim 36 wherein:

said gas pressure regulator is a zero gas pressure regulator.

38. The supply system of claim 36 wherein:

said gas pressure regulator is a negative gas pressure regulator.

39. The supply system of claim 35 wherein:

said supply system includes a plenum-venturi element interposed between said air blower and said burner, said plenum-venturi element having an opening extending therethrough which defines said air supply plenum, said venturi section and a portion of said mixture passage.

40. The supply system of claim 39 further comprising:

an orifice plate removably interposed between said outlet of said air blower and said opening extending through said plenum-venturi element, said orifice plate having an air orifice opening operatively positioned between said outlet of said air blower and said air supply plenum, and a fuel orifice opening operatively positioned between said fuel supply means and said central throat portion of said venturi section, said orifice openings being relatively sized to provide said mixture with a predetermined air-fuel ratio during operation of said supply system.

41. The supply system of claim 39 wherein:

said burner is disposed within a heating cavity portion of said frypot section enclosed by a solid insulation structure, and said plenum-venturi element is formed from a block of solid insulating material which defines a portion of said solid insulation structure.

42. Deep fat frying apparatus comprising:

a frypot adapted to hold a quantity of cooking oil, said frypot having an upper section having a bottom wall, and at least one well section depending from said bottom wall;

fuel-fired heating means for heating cooking oil disposed in said frypot; and electric shortening melter means extending along said bottom wall and selectively operable to melt a quantity of solid shortening disposed in said upper section, and resting upon said bottom wall, to form, within said frypot, cooking oil to be heated by said fuel-fired heating means.

43. The apparatus of claim 42 wherein:

said electric shortening melter means include an insulating member positioned exteriorly against said bottom wall, and heating coil means imbedded in an upper surface portion of said insulating member.

* * * * *

UNITED STATES PATENT AND TRADEMARK OFFICE
CERTIFICATE OF CORRECTION

PATENT NO. : 4,913,041

DATED : April 3, 1990

INVENTOR(S) : Bruce E. Tabor, James T. Grob

It is certified that error appears in the above-identified patent and that said Letters Patent is hereby corrected as shown below:

Col. 15, line 20, "initial gas pressure in the blower outlet 2.7" $H_2O$), the" should be --initial gas pressure drop across the orifice $186_a$ is 0.8" $H_2O$. Upon a 10% decrease in the blower outlet pressure (to 2.7" $H_2O$), the--

Col. 23, line 14, after "said" insert --outlet,--

Col. 25, line 55, "outlet;" should be --outlet,--

Signed and Sealed this

Third Day of September, 1991

Attest:

HARRY F. MANBECK, JR.

Attesting Officer

Commissioner of Patents and Trademarks